United States Patent [19]

Evans

[11] 4,346,591
[45] Aug. 31, 1982

[54] SENSING IMPENDING SEALED BEARING AND GAGE FAILURE

[76] Inventor: Robert F. Evans, 631 Honeywood La., La Habra, Calif. 90631

[21] Appl. No.: 295,025

[22] Filed: Aug. 21, 1981

[51] Int. Cl.³ .......................................... G01M 3/16
[52] U.S. Cl. .......................................... 73/151; 73/46; 175/39; 340/605
[58] Field of Search ................. 73/151, 46; 324/65 R; 175/39; 340/605, 604; 200/182, 186, 193

[56] References Cited

U.S. PATENT DOCUMENTS

| | | | |
|---|---|---|---|
| 2,658,724 | 11/1953 | Arps | 255/1 |
| 3,011,566 | 12/1961 | Graham | 175/39 |
| 3,058,532 | 10/1962 | Alder | 175/39 |
| 3,062,302 | 11/1962 | Toth | 175/39 |
| 3,145,784 | 8/1964 | Crake | 175/40 |
| 3,345,867 | 10/1967 | Arps | 73/151 |
| 3,363,702 | 1/1968 | Bielstein | 175/39 |
| 3,407,508 | 10/1968 | Baskir | 33/204 |
| 3,578,092 | 5/1971 | Tesch | 175/39 |
| 3,581,564 | 6/1971 | Young | 73/151 |
| 3,678,883 | 7/1972 | Fischer | 116/114 |
| 3,693,428 | 9/1972 | Le Peuvedic | 73/151 |
| 3,714,822 | 2/1973 | Lutz | 73/104 |
| 3,716,426 | 2/1973 | Becker | 149/38 |
| 3,774,445 | 11/1973 | Rundell | 73/151 |
| 3,789,297 | 1/1974 | Frolich | 73/46 X |
| 3,865,736 | 2/1975 | Fries | 252/11 |
| 4,001,531 | 1/1977 | Crockett, Sr. | 340/604 X |
| 4,021,774 | 5/1977 | Asmundsson et al. | 340/18 |

OTHER PUBLICATIONS

"Downhole Mud Pulse Telemetry", Department of Energy, Brochure No. EDM-1109.
"Mud Pulse Logging While Drilling Telemetry System— Design, Development and Demonstrations," Department of Energy DOE Contract No. ET-7-6-C-03-1817.
"MWD — Tough Nut with a Bright Future," by Robert O. Frederick, Drilling-DCW, Jul., 1980.

*Primary Examiner*—Jerry W. Myracle
*Attorney, Agent, or Firm*—John R. Ley

[57] ABSTRACT

Impending bearing failure, seal failure and drilling an undergage well bore, among other things, are immediately detected by sensing the presence of aqueous drilling fluid in a lubricant or other type of sealed cavity of a drilling tool or the like during a downhole drilling operation in an environment of aqueous fluid. Electrical conduction elements are preferably employed to sense the presence of the aqueous fluid. The electrical conduction means may employ a soluble anhydrous conductive material which, when in contact with the aqueous drilling fluid, dissolves or becomes an electrical conductor to signal the presence of the aqueous fluid. The aqueous fluid may additionally serve as an electrolyte between two dissimilar metals, thereby forming a galvanic cell, or as a conductor between a pair of contact terminals. In a drilling operation, a signal is preferably transmitted from a downhole location to the surface of the earth by mud pulse telemetry. In order to sense the drilling of an undergage well bore, material normally plugging the entrance of a conduit leading to the cavity is eroded during excessive wear, thereby admitting aqueous fluid to the cavity.

20 Claims, 5 Drawing Figures

SENSING IMPENDING SEALED BEARING AND GAGE FAILURE

This invention pertains to drilling well bores and the like by use of sealed bearing rotary drill bits and drilling tools. More particularly, the present invention pertains to a new and improved method and apparatus for sensing the conditions and environments of a bearing assembly in a downhole drilling tool or the like to detect conditions leading to impending failure, and the failure of the seal assembly.

The desirability of detecting at any early time the impending failure of a rotary drill bit has long been recognized in the art. Failure to terminate drilling and pull or remove the drill bit from the well bore prior to gross failure of the bearings rotationally attaching the cone wheel cutter to the bit frequently results in disconnection of the cutter wheel and leaving one or more of the cutter wheels at the bottom of the well bore. Before additional drilling can commence, an expensive fishing job, using a magnetic fishing tool, is required to remove the disattached cutter wheel from the bottom of the well bore. In some very specific drilling conditions, wear on the gage cutting teeth of the cutter wheel is a problem of considerable consequence if the use of an undergage bit must be followed by the use of a new full gage bit. The segment of undergage well bore often interferes with or damages the new full gage bit as the bit passes through the undergage segment. The most prevalent concern is, however, excessive wear of the bearings to a point where one or more of the cutter wheels is disconnected from the drill bit.

Previous devices which sense the condition of the antifrictions bearings are those which respond to heat and to the condition of the various wear and bearing surfaces, and which are triggered by the release of excessive amounts of bearing lubricant, thereby indicating a failure of the bearing seal. Prior devices for monitoring the general wear condition of the bit are those which measure and depend on the number of revolutions of the bit, the drill bit weight, vibrations generated during drilling, torque on the drill bit, and relative rotational rates of the drill bit and the cutter wheels. Other prior art devices respond to a worn condition of the cutting elements of the teeth on the cone wheel cutter and to the drilling of an undergage section of the well bore. Various different apparatus have been employed to convey or relay the signal from the downhole sensor device to the drilling operator at the surface of the earth. Many of the sensor devices are connected to devices which modify the pressure in the column of drilling fluid supplied through the center drilling fluid passageway in the drill string, either by increasing or decreasing the pressure of the drilling fluid. Radioactive material has been released to the drilling fluid upon one or more of the sensed conditions occurring and is detected in the drilling fluid expelled from the borehole in the annulus surrounding the drill string. Sensors even activate devices which cause one or more of the cutter wheels to lock up and quit rotating, increasing the amount of torque required to rotate the drill bit and presumably serving as an indication of the occurrence of a sensed event. Probably the most reliable method of transmitting downhole signals to the surface of the earth is mud pulse telemetry, particularly since great advances in the reliability and usefulness of such telemetry systems have been devised in recent time. The majority of these prior sensing devices and some of the communication signalling approaches have failed commercially because they required an inordinant amount of effort, interest and understanding on the part of the drill rig crews, it is believed. The need to reliably and easily sense impending bearing and seal failure in downhole drilling tools and the like still exists.

SUMMARY

It is the primary object of the present invention to sense the presence of aqueous drilling fluid in a lubricant cavity of a sealed and lubricated bearing assembly of a downhole drill bit or other drilling tool, thereby obtaining an indication of impending bearing failure. Another objective of the present invention pertains to indirectly sensing the integrity and condition of a seal assembly in a downhole drilling tool or the like, because failure of the seal admits aqueous drilling fluid and is the primary reason for failure of lubricated assemblies such as bearing assemblies. Still another object of the present invention is to sense wear conditions on the drill bit which would lead to drilling an undergage well bore. A further object of the present invention is to provide a reliable and effective downhole sensor for signalling the occurrence of the event sensed, such as the presence of aqueous drilling fluid. In general, an overall objective of the present invention is to provide a new and improved method and apparatus of sensing and signalling the impending failure of a drill bit or drilling tool, which is relatively simple for drill rig crews to employ, understand and effectively utilize.

In accordance with these objectives, the present invention comprises signal delivery or electrical conduction means located in the lubricant confining cavity of a bearing of a downhole drilling tool. The electrical conduction means is responsive to and becomes activated by the presence of aqueous drilling fluid in the lubricant cavity. So long as lubricant is present and not displaced by aqueous drilling fluid, the electrical conduction means is not activated and no signal is supplied. Once a signal is supplied, it is communicated to the surface of the earth to the drilling crew, preferably by a downhole mud pulse telemetry device. Among other forms, the electrical conduction means may comprise a pair of dissimilar metals in the electromotive force series. The admission of the aqueous drilling fluid serves as an electrolyte to form a galvanic cell, and the small voltage generated by the dissimilar metals is sensed and amplified. The electrical conduction means may also comprise two conductor terminals embedded in a soluble cast salt which is initially in an anhydrous state. As aqueous drilling fluid enters, the salt becomes a hydrated electrical conductor and completes a circuit between the two terminals. A porous material impregnated with a dry soluble salt may be used in place of the cast soluble salt. The electrical conduction means may also comprise a pair of resilient electrical switch contacts which are normally separated by a dry soluble nonconductor until the aqueous drilling fluid dissolves the separating material in solution and allows the contact points to come together. The reverse procedure of holding closed a pair of normally open contacts by use of a soluble material may also be employed. The features of the present invention and its various embodiments secure advantages and improvements in sensing impending bearing failure and seal integrity.

The present invention is defined by the scope of the appended claims. The invention is better understood by comprehension of its preferred embodiments described in its following detailed description and in the drawings.

DRAWINGS

FIG. 1 illustrates a broken away portion of one leg of a drill bit with a cone wheel cutter shown in cross section, a lubricated bearing assembly attaching the cutter wheel to a journal of the bit, and an exemplary lubricant confining seal, as well as an electrical conduction means of the present invention which is electrically connected through an amplifier or sensor switch to a downhole transmitting device, the latter two devices shown in block diagrammatic form.

PREFERRED EMBODIMENTS

Figure 1:
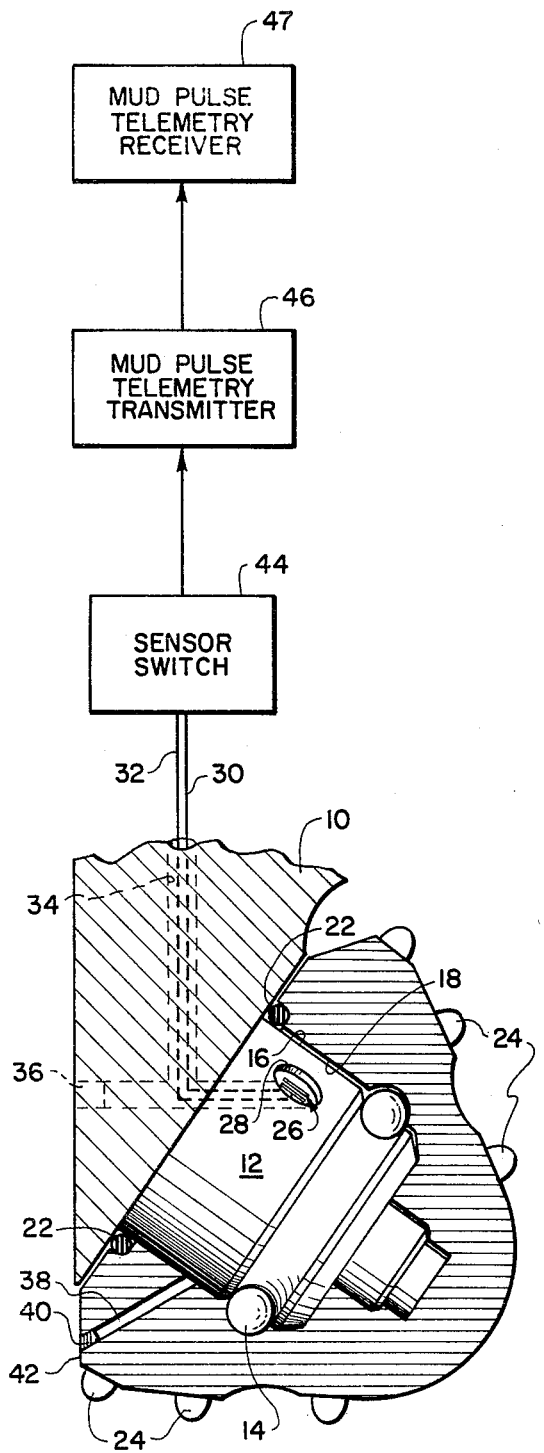

The preferred embodiments of the present invention are described in conjunction with a sealed and lubricated antifriction bearing assembly of a downhole earth drilling tool such as a drill bit, as shown in FIG. 1. It should be understood, however, that the present invention can be employed in any type of sealed cavity subjected to a drilling environment or the like, including deep submergence ocean environments. A drill bit typically includes one or more legs 10 from which a journal pin 12 extends at a journal angle. A bearing assembly represented by ball bearings 14 and opposing bearing surfaces 16 and 18 rotationally connects a cone wheel cutter 20 to the drill bit. A seal element, such as a conventional O-ring seal 22, extends between the surfaces 16 and 18 for the purpose of sealing the surfaces against the admission of abrasive drilling fluid on the exterior of the drill bit and against the expulsion of lubricant from within a lubricant cavity. The lubricant cavity is generally defined by the space surrounding the journal pin 12 and within an interior opening formed in the cone cutter 20 to receive the ball bearing elements 14 and other conventional elements associated therewith. Lubricant is present in the lubricant cavity as a result of initially filling the lubricant cavity and, as is typical, as a result of a pressure responsive compensator or reservoir (not shown) formed in the drill bit leg 10. When the drill bit contacts the drill face at the bottom of the well bore, the drill bit is rotated by rotating the drill string to which the drill bit is connected. The rotating drill string causes each cone cutter 20 to rotate in contact with the drill face of the well bore. Cutting teeth or elements 24 of the rotating cone wheel cutter 20 contact the drill face and chip, grind and otherwise destroy the rock or earth formation and advance the well bore. The earth particles removed are transported out of the well bore by a flow of drilling fluid flowing up the well bore in the annulus between the drill string exterior and the side wall of the well bore.

In order to sense the presence of aqueous drilling fluid in the lubricant cavity, and thereby detect or sense the failure of the seal 22 and obtain an indication of the impending failure of the bearing assembly as a result of loss of lubricant and accelerated wear, an electrical conduction means 26 is located in a recess 28 formed on the upper or unloaded bearing surface 16 of the journal pin 12. The bearing surface 16 is unloaded at the upper location of the recess 28 because the downward force from the drill bit and upward force on the cone wheel cutter 20 from the earth formation causes the majority of the load present between the journal pin and the cone wheel cutter to be distributed over the lower circuit half of the journal pin 12. Accordingly, the electrical conduction means 26 at the upper unloaded area at the recess 28 is not influenced by wear resulting from relative movement of the surfaces 16 and 18. A pair of electrical conductors 30 and 32 extend to the electrical conduction means 26 through passageways 34 drilled through the drill bit body and leg 10. After the passageways 34 have been drilled, exterior open ends are plugged, as shown at 36, to prevent drilling fluid and debris from entering the passageways.

In addition to detecting the failure of the seal 22, means in the form of a conduit 38 and plug 40 are provided in the cone wheel cutter 20 to detect a wear condition of the cutter 20 indicating that an undergage well bore is being drilled. The conduit 38 is drilled from the surface cutting the maximum diameter of the well bore, known as the gage cutting surface 42, to the surface 18. A plug 40, formed by a thin layer of welding material deposited in the outermost end of the conduit 38, normally plugs the conduit 38. However, when sufficient wear at the gage cutting surface 42 occurs such that the conduit plug 40 is eroded, aqueous drilling fluid is admitted through the conduit 38 into the lubricant cavity.

The electrical conduction means 26 may take on a variety of different configurations or embodiments, four of which are illustrated in FIGS. 2 through 5, respectively. All of the embodiments of the electrical conduction means 26 are activated by the presence of an aqueous drilling fluid. Upon activation, an electrical signal is present between conductors 30 and 32 and is received at sensor switch 44. The sensor switch 44 may in reality be an amplifier or other electrical device suitable for converting the signal from the electrical conduction means 26 to an activation signal compatible for activating a transmitter means 46. The transmitter means delivers a transmitted signal which indicates the presence of aqueous drilling fluid. The transmitter means 46 preferably takes the form of a conventional mud pulse telemetry transmitter known in the art and useful for delivering detectable pulsed pressure variations in the column of drilling fluid in the center drilling fluid passageway of the drilling string. The pressure pulse variations are detected by a mud pulse telemetry receiver 47 at the drilling rig at the surface of the earth and are decoded to provide intelligence of the type and significance of signal transmitted. A variety of other known types of downhole signal communication systems can be employed other than mud pulse telemetry systems.

Figure 2:
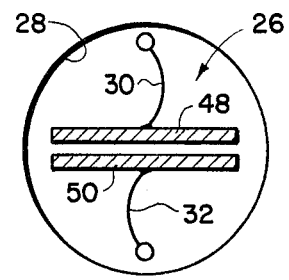
FIG. 2 is an enlarged view of one embodiment of an electrical conduction means of the present invention illustrating a pair of dissimilar metals forming a galvanic cell.

One embodiment of the electrical conduction means 26 shown in FIG. 2 comprises a galvanic cell defined by two metal pieces 48 and 50 which are dissimilar and selected for their positions in the electromotive force series. The metal piece 48 is connected to conductor 30 and the metal piece 50 is connected to conductor 32. With the failure of the O-ring seal 22, excessive wear of the gage cutting surface 42, or other reason resulting in the admission of aqueous drilling fluid into the lubricant cavity, the aqueous fluid serves as an electrolyte and forms a galvanic cell with the metal pieces 48 and 50. A small voltage is generated on the conductors 30 and 32. The small voltage is sensed by the sensor switch 44 which activates the transmitter 46. One of the metal pieces 48 or 50 could be copper and the other zinc, or alternatively, one of the metals could be copper and the other aluminum. Other suitable pairs can be selected from the electromotive force series.

Figure 3:
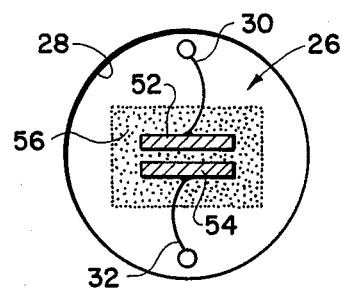
FIG. 3 is an enlarged view of another embodiment of an electrical conduction means of the present invention illustrating two conductor terminals embedded in a cast soluble anhydrous salt.

Another embodiment of the electrical conduction means 26 is shown in FIG. 3. Two conductor terminals 52 and 54 are embedded in a cast soluble salt 56 in an anhydrous state. In its anhydrous state, the salt is a nonconductor. As aqueous drilling fluid enters the lubricant cavity, the salt 56 becomes hydrated and becomes a conductor to complete a circuit between conductors 30 and 32, which are respectively connected to the terminals 52 and 54. The completed circuit is sensed by the sensor switch 44, and the transmitter 46 is activated. Sodium chloride is an example of a cast soluble salt 56 which is nonconductor in its anhydrous state and a conductor when hydrated.

Figure 4:
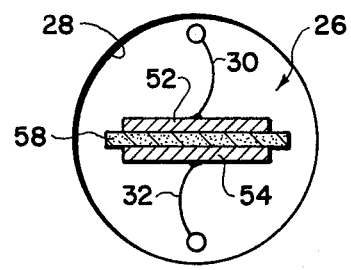
FIG. 4 is an enlarged view of another embodiment of an electrical conduction means of the present invention illustrating a felt material impregnated with dry soluble salt separating two conductor terminals.

The embodiment of the electrical conduction means 26 shown in FIG. 4 is similar to that shown in FIG. 3. A porous felt material 58 is impregnated with a dry soluble salt and is used to separate the conductor terminals 52 and 54. Upon the presence of suitable aqueous drilling fluid, the soluble salt impregnated in the felt material 58 becomes a conductor to complete the circuit between the conductor terminals 52 and 54.

Figure 5:
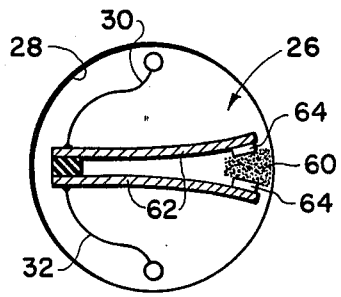
FIG. 5 is an enlarged view of another embodiment of an electrical conduction means of the present invention illustrating a pair of resilient, normally closed, switch contact points separated by a soluble dry nonconductor.

The embodiment of the electrical conduction means 26 shown in FIG. 5 comprises a normally closed switch 58 held in an open or nonconducting position by a soluble dry nonconductive material 60. The switch comprises a pair of resilient arms 62 upon which contact points 64 are mounted. Upon the admission of aqueous drilling fluid, the nonconductive material 60 dissolves and allows the resiliently of the switch arms 62 to move the contact points 64 into contact with one another. The contacting points 64 complete the electrical circuit through conductors 30 and 32. The sensor switch 44 detects the closed circuit at the switch 58 and activates the transmitter 46.

A normally open switch held closed by a casting of a soluble nonconductive material is also comprehended, in comparison with the embodiment shown in FIG. 5. In such an embodiment of the electrical conduction means, the admission of aqueous drilling fluid dissolves the nonconductive material and allows the switch to open, thereby creating a discontinuity through conductors 30 and 32. In this embodiment, the sensor switch 44 is designed to respond to a discontinuity before activating the transmitter 46.

It is apparent from the foregoing description that relatively simple and reliable electrical conduction means are provided to sense the presence of aqueous drilling fluid in a lubricant or other cavity. Upon the admission of the aqueous drilling fluid, an indication is delivered of impending bearing failure because of the lack of suitable lubricant for the moving parts of the bearing assembly in the cavity. In most cases, the presence of aqueous drilling fluid in the cavity will be the result of seal failure. The drill rig operator is immediately provided with an indication of impending bearing failure and can terminate further drilling before the bearing experiences sufficient destructive wear that might result in disconnection and loss of a cone cutter at the bottom of the well bore. In those applications where it is of critical importance to avoid drilling an undergaged well bore, a signal is supplied if the gage cutting surface experiences sufficient wear that an undergage well segment is being drilled. It is apparent, therefore, that critical drilling functions, i.e. bearing failure, seal failure and drilling an undergage well bore, can be immediately detected. Corrective measures can be taken before serious adversity results. Effective use of the present invention does not require an inordinant amount of effort, interest or understanding on the part of drill rig operating personnel.

Preferred embodiments of the present invention have been shown and described with a degree of particularity. It should be understood, however, that the present disclosure has been made by way of example. The invention itself is defined by the scope of the appended claims.

What is claimed is:

1. In a drilling tool having a sealed and lubricated bearing assembly, means for sensing the admission of aqueous drilling fluid to a lubricant cavity of the bearing assembly, comprising, in combination:

means communicating with the lubricant cavity of the bearing assembly, and activated upon the presence of aqueous drilling fluid, for delivering a signal upon the presence of aqueous drilling fluid in the lubricant cavity.

2. An invention as defined in claim 1 wherein said means for delivering a signal comprises electrical conduction means for delivering an electrical signal.

3. An invention as defined in claim 2 comprising a galvanic cell activated by admitted drilling fluid.

4. An invention as defined in claim 2 wherein said electrical conduction means comprises a pair of electrically conductive metals separated by a soluble anhydrous nonconductive material prior to the admission of aqueous drilling fluid.

5. An invention as defined in claim 4 wherein the soluble anhydrous nonconductive material is of the type dissolved by aqueous drilling fluid.

6. An invention as defined in claim 5 wherein the pair of electrically conductive metals are normally resiliently biased toward electrical contact with one another and are initially separated by the soluble anhydrous nonconductive material.

7. An invention as defined in claim 2 wherein said electrical conduction means comprises an electrical switch having a pair of contacts initially held in nonnormal switch position by a soluble anhydrous material.

8. An invention as defined in claim 2 wherein said electrical conduction means comprises a pair of electrical conductors separated by a porous material impregnated with an anhydrous soluble material.

9. An invention as defined in claim 2 further comprising, in combination:

sensor switch means electrically connected to said electrical conduction means, for supplying an activation signal upon receipt of the signal from said electrical conduction means; and transmitter means receptive of the activation signal for transmitting a transmitted signal indicating the admission of aqueous drilling fluid into the lubricant cavity.

10. An invention as defined in claim 9 wherein said transmitter means is part of a mud pulse telemetry system.

11. An invention as defined in claim 2 wherein the sealed and lubricated bearing assembly is operative between a journal pin of the drill bit and a cutter wheel carried by the journal pin, and said electrical conduction means is located in a recess formed on an unloaded surface of the journal pin.

12. An invention as defined in claim 1 or 2 further comprising:
   a conduit extending through the cutter wheel from a gage cutting surface thereof to the lubricant cavity; and
   plug means plugging the conduit at the gage cutting surface and adapted to be worn away to open the conduit upon excessive wear at the gage cutting surface.

13. An invention as defined in claim 1 wherein said means for delivering a signal comprises a pair of dissimilar metals in the electromotive force series separated by a space, which, when occupied by admitted aqueous drilling fluid, defines a galvanic cell.

14. An invention as defined in claim 1 wherein the sealed and lubricated bearing assembly is operative between a journal pin of the drill bit and a cutter wheel carried by the journal pin.

15. A method of detecting impending failure of a sealed bearing assembly operative between relatively movable parts of a drilling tool during a downhole drilling operation in a drilling environment which includes aqueous drilling fluid, comprising:
   sensing the presence of aqueous drilling fluid in a cavity wherein said bearing assembly is operative; and
   transmitting a signal out of the drilling environment upon sensing the presence of aqueous drilling fluid in the cavity.

16. A method as defined in claim 15 for use in detecting the failure of a seal assembly associated with the cavity.

17. A method as defined in claim 15 or 16 wherein said bearing assembly is operative between a journal pin and a cutter wheel rotationally mounted on the journal pin.

18. A method of detecting excessive wear of the gage cutting elements of a drill bit during a downhole drilling operation in a drilling environment which includes aqueous drilling fluid, comprising:
   forming a cavity in the drill bit which is normally devoid of aqueous drilling fluid,
   extending an open conduit from the cavity to a gage cutting surface,
   plugging the open end of the conduit at the gage cutting surface,
   allowing excessive wear to erode the plug at the open end of the conduit to thereby admit aqueous drilling fluid to the conduit and cavity,
   sensing the presence of aqueous drilling fluid in the cavity, and
   transmitting a signal out of the drilling environment upon sensing the presence of aqueous drilling fluid in the cavity.

19. A method as defined in claim 15, 16 or 18 wherein the step of sensing the presence of aqueous fluid comprises dissolving a soluble material.

20. A method as defined in claim 15, 16 or 18 wherein the step of sensing the presence of aqueous fluid comprises completing an electrical circuit through the aqueous fluid admitted into the cavity.

* * * * *